United States Patent [19]

Wakabayashi

[11] Patent Number: 5,499,276
[45] Date of Patent: Mar. 12, 1996

[54] METHOD FOR MINOR ACTINIDE NUCLIDES INCINERATION

[75] Inventor: Toshio Wakabayashi, Mito, Japan

[73] Assignee: Doryokuro Kakunenryo Kaihatsu Jigyodan, Tokyo, Japan

[21] Appl. No.: 313,815

[22] Filed: Sep. 28, 1994

[30] Foreign Application Priority Data

Oct. 6, 1993 [JP] Japan .................. 5-275017

[51] Int. Cl.$^6$ ........................................ G21G 1/06
[52] U.S. Cl. ..................... 376/170; 376/171; 376/172; 376/173; 376/184; 376/197; 376/200; 252/641; 252/642; 252/643
[58] Field of Search ................. 376/170, 171, 376/172, 173, 184, 197, 200; 252/641, 642, 643

[56] References Cited

U.S. PATENT DOCUMENTS

| | | | |
|---|---|---|---|
| 3,664,923 | 5/1972 | Connolly | 376/175 |
| 3,962,401 | 6/1976 | Tsuboya et al. | 423/10 |
| 4,555,318 | 11/1985 | Beitz | 204/157.1 |
| 4,774,026 | 9/1988 | Kitamori et al. | 252/627 |
| 4,814,046 | 3/1989 | Johnson et al. | 204/1.5 |
| 5,112,534 | 5/1992 | Guon et al. | 252/640 |
| 5,149,491 | 9/1992 | Congdon et al. | 376/267 |
| 5,160,696 | 11/1992 | Bowman | 376/189 |
| 5,299,241 | 3/1994 | Suzuki et al. | 376/170 |
| 5,372,794 | 12/1994 | LeMaire et al. | 423/2 |
| 5,400,375 | 3/1995 | Suzuki et al. | 376/435 |

OTHER PUBLICATIONS

"Destroying Actinide in Nuclear Reactors" by McKay Jan. 1978 vol. 23, No. 266, pp. 40–43, Nuclear Engineering International.

"Power Production and Actinide Elimination by Fast Reactor Cycle" by Murphy, Jr. vol. 45, Oct. 1976 pp. 299–306, Nuclear Technology.

Primary Examiner—Donald P. Walsh
Assistant Examiner—Meena Chelliah
Attorney, Agent, or Firm—Dickstein, Shapiro & Morin

[57] ABSTRACT

Neptunium of minor actinide nuclides separated from spent fuel is added to fuel of reactor cores (inner reactor cores and/or outer reactor cores) of a fast reactor and americium of the separated minor actinide nuclides and rare earth elements are added to either or both of radial and axial blankets of the fast reactor for burning. Thus, the minor actinide nuclides with long half-lives can be burnt with the fast reactor core with the minimized effects of the rare earth elements. For a burner reactor, americium and rare earth elements may be added to shields for burning. Curium may be added together with americium and rare earth elements. Neptunium is added in amount of 2% to 5% by weight based on the weight of the fuel and the rare earth elements are added in an amount of 50% by weight or less based on the weight of the fuel. A Purex process is used to separate neptunium and a Truex process is used to separate americium and curium.

17 Claims, 2 Drawing Sheets

METHOD FOR MINOR ACTINIDE NUCLIDES INCINERATION

BACKGROUND OF THE INVENTION

1. Field of the Invention

This invention relates to a method for minor actinide nuclides incineration by burning them with minimized effects from rare earth elements.

2. Description of the Related Art

Spent fuel in a light-water reactor contains minor actinide nuclides with long half-lives. Use of a fast reactor for the minor actinide nuclides incineration is currently being studied. To do this, the minor actinide nuclides need to be separated and extracted from the spent fuel. In the nuclide separation technique, neptunium (Np) of the minor actinide nuclides can be easily separated from the spent fuel by a Purex process. Americium (Am) and curium (Cm) can be separated by a Truex process. However, since americium and curium exhibit almost the same behavior as rare earth elements, when americium and curium are separated from the spent fuel, rare earth elements are also extracted at the same time.

FIG. 1 is an illustration showing the percentage of nuclides taken out in each process of spent fuel reprocessing. The Purex process and the Truex process may be combined to provide a method of separating minor actinide nuclides from light-water reactor spent fuel. In this method, plutonium (Pu), neptunium (Np), and uranium (U) are extracted with the Purex process and americium (Am), curium (Cm), and a large amount of rare earth elements are extracted with the Truex process. Thus, when minor actinide nuclides are added to reactor core fuel to make them incinerate, rare earth elements are inevitably mixed at the same time.

However, the rare earth elements exist in large quantities (ten times or more) compared with americium and curium, and are large in neutron absorption; if a reasonable amount of americium and curium extracted from spent fuel is added to the reactor core for americium and curium incineration, because of the neutron absorption of the rare earth elements, the reactivity required for burning becomes large, leading to difficult operation control of the fast reactor.

SUMMARY OF THE INVENTION

It is therefore an object of the invention to provide a method whereby minor actinide nuclides with long half-lives can be burnt with a fast reactor core with minimized effects from rare earth elements.

To this end, according to the invention, there is provided a method of minor actinide nuclides incineration by adding neptunium of minor actinide nuclides separated from spent fuel to reactor core fuel of a fast reactor and adding americium of the separated minor actinide nuclides and rare earth elements to either or both of radial and axial blankets of the fast reactor. To use a plutonium burner reactor rather than a plutonium breeding reactor, americium and rare earth elements may be added to either or both of radial and axial shields in place of the blankets for nuclear reaction. Curium may be added together with americium and rare earth elements.

Preferably, neptunium is added in an amount of 2% to 5% by weight based on the weight of the fuel, and the rare earth elements are added in an amount of 50% by weight or less based on the weight of the fuel. A Purex process is used to separate neptunium and a Truex process is used to separate americium and curium.

In the Purex process, neptunium of the minor actinide nuclides can be separated and extracted without containing rare earth elements. In contrast, in the Truex process, americium and curium can be separated, but rare earth elements which are large in neutron absorption are also taken out in large quantities at the same time. If neptunium is then added to the reactor core fuel, it is burnt and made to incinerate with little effect on the reactor core characteristics because rare earth elements are not contained. On the other hand, if americium and curium are added to the blankets or shields, they are burnt with extra neutrons outside the reactor core. Rare earth elements inevitably added at the same time exist only in the blankets or shields and therefore have little effect on the reactor core characteristics. Thus, the minor actinide nuclides can be made to incinerate by limiting addition areas in the fast reactor in response to the type and nature of separated minor actinide nuclides.

According to the invention, there is provided a method for an efficient nuclear reaction of americium and curium in a mixture of americium, curium, and rare earth elements, the method comprising the steps of adding neptunium to reactor core fuel of a fast reactor and placing the mixture on the periphery of the reactor core fuel to which the neptunium is added for causing a nuclear reaction to occur. According to the method of the invention, an efficient nuclear reaction can be caused to occur for a mixture of americium and curium which will efficiently cause the elements in the mixture to incinerate.

In the method, preferably, neptunium is added to the reactor core fuel in an amount of 2% to 5% by weight based on the weight of the reactor core fuel, and a percentage of the rare earth elements in the mixture of americium, curium, and rare earth elements is 50% or less. In the method, preferably, the mixture of americium, curium, and rare earth elements is stored in either or both of radial and axial blankets, thereby placing the mixture on the periphery of the reactor core fuel.

According to the invention, there is provided a method for inciration of americium and curium, comprising the steps of: separating neptunium from spent nuclear fuel, separating americium and curium from spent nuclear fuel, placing the separated americium and curium on the periphery of the separated neptunium in a fast reactor, and causing neptunium to initiate a nuclear reaction for causing an efficient nuclear reaction to occur for the americium and curium.

In the method of the invention, preferably, a Purex process is used to separate neptunium from the spent nuclear fuel and a Truex process is used to separate americium and curium from the spent nuclear fuel. In the method, preferably, a mixture of or both of radial and axial blankets, thereby placing the mixture on the periphery of the reactor core fuel.

DESCRIPTION OF THE PREFERRED EMBODIMENTS

FIG. 2 is an illustration showing an example of a fast breeder reactor for carrying out a method according to the invention. The reactor core structure adopts a homogeneous 2-region core wherein outer reactor cores 12 have higher enrichment of plutonium (Pu) than inner reactor cores 10 for flattening power distribution. Axial blankets 14 are disposed on the top and bottom of the reactor core and a radial blanket 16 is disposed on the outer peripheral surface of the core. Minor actinide nuclides are extracted by using the above-mentioned known technique. To prevent rare earth elements adversely affecting reactor core characteristics from mixing with reactor core fuel, in the invention, neptunium separated and extracted by the Purex process is added to the reactor core fuel and americium, curium, and rare earth elements extracted by the Truex process are added to the axial blankets and/or radial blankets.

Figure 1:
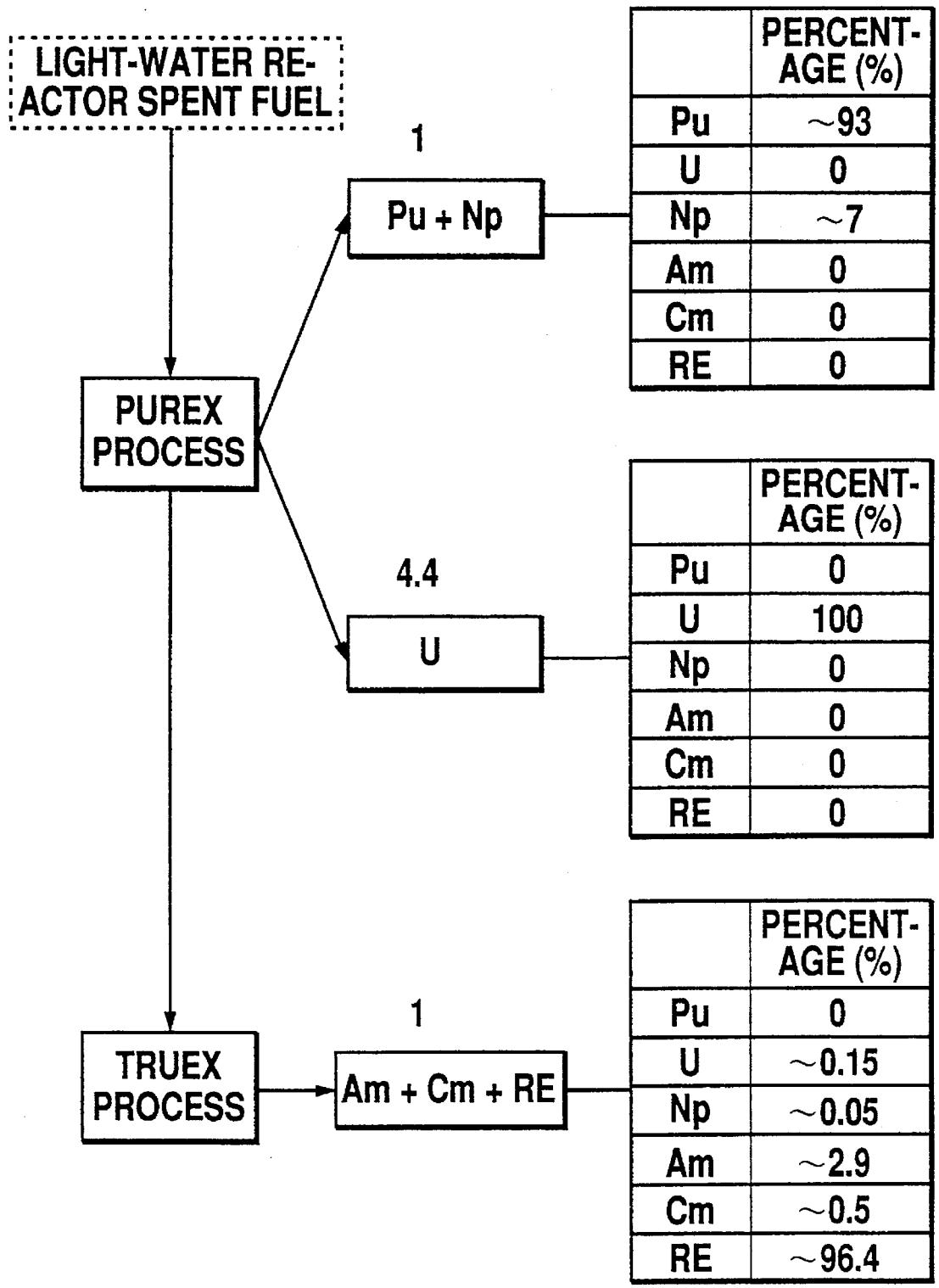
FIG. 1 is an illustration showing the percentage of nuclides taken out in each process of spent fuel reprocessing.
Figure 2A:
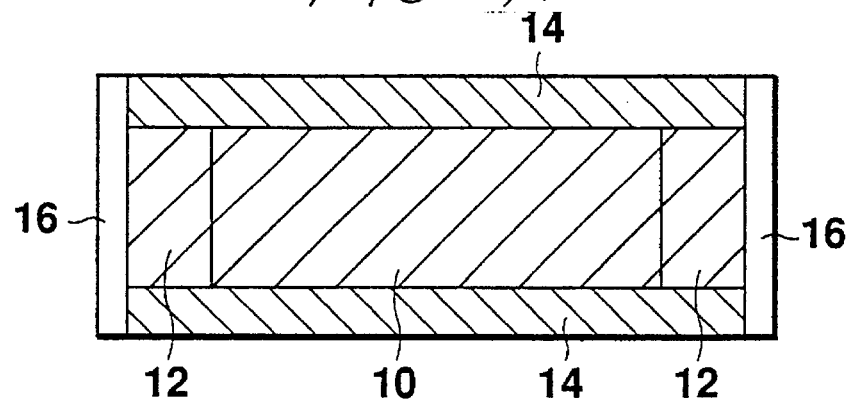
FIGS. 2A, 2B, and 2C are illustrations showing how to load minor actinide nuclides into a fast breeder reactor.
Figure 2B:
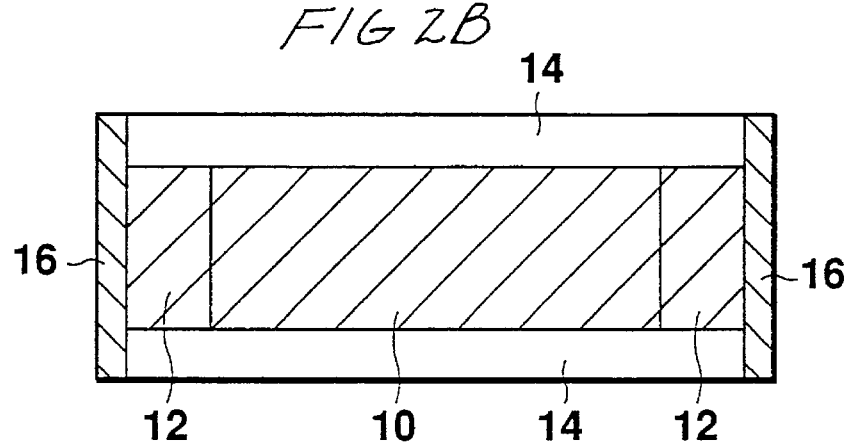
Figure 2C:
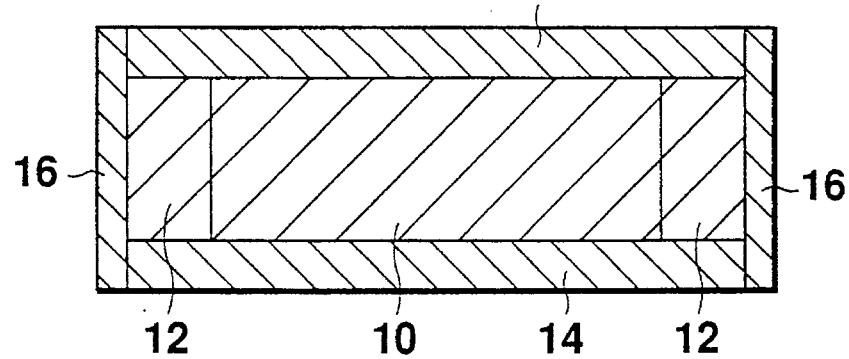

FIG. 2A shows a structure wherein neptunium is added to all of the reactor core fuel, while americium, curium, and rare earth elements are added to the axial blankets 14. FIG. 2B is a structure wherein neptunium is added to all of the reactor core fuel, while americium, curium, and rare earth elements are added to the radial blanket 16. FIG. 2C is a structure wherein neptunium is added to all of the reactor core fuel, while americium, curium, and rare earth elements are added to the axial blankets 14 and the radial blanket 16.

A burner reactor intended only for burning plutonium has no blankets; instead it comprises shields located axially and radially. In this case, neptunium may be added to the reactor core fuel and americium, curium, and rare earth elements may be added to either or both of the axial and radial shields, as in the fast breeder reactor described above.

generation amount; their manufacturing requires a cell surrounded by thick shields. In contrast, neptunium has a very small neutron generation amount, gamma dose, and heat generation amount; manufacturing of neptunium does not require any large-scaled shields, and a glove box is sufficient for the purpose. Therefore, according to the invention, reactor core fuel with severe manufacturing specifications can be manufactured in a glove box and a rise in costs can be suppressed. Curium-244 occupying most of the neutron generation amount has a comparatively short half-life of 18.1 years. Thus, curium-244 may be made to decay by storage in order to reduce the manufacturing load before it is loaded into the reactor core.

Table 1 lists reactor core characteristics of a 1000-MWE class fast breeder reactor using oxide fuel. Case 1 is an example in which neptunium, americium, curium, and rare earth elements are all added to the reactor core fuel. In contrast, Cases 2 to 4 in the invention are examples where neptunium is added to the reactor core fuel, while americium, curium, and rare earth elements are added only to the axial blankets, only to the radial blanket, and to both the axial and radial blankets, respectively.

TABLE 1

| PARAMETER | CASE 1 | CASE 2 | CASE 3 | CASE 4 |
|---|---|---|---|---|
| ADDITION TO REACTOR CORE FUEL | Np: 5% Am,Cm: 0.7% RARE EARTH ELEMENTS: 20% | Np: 5% | Np: 5% | Np: 5% |
| ADDITION TO AXIAL BLANKETS | NONE | Am,Cm: 0.7% RARE EARTH ELEMENTS: 20% | NONE | Am,Cm: 0.7% RARE EARTH ELEMENTS: 20% |
| ADDITION TO RADIAL BLANKET | NONE | NONE | Am,Cm: 0.7% RARE EARTH ELEMENTS: 20% | Am,Cm: 0.7% RARE EARTH ELEMENTS: 20% |
| BURN UP REACTIVETY (%Δk/kk') | 4.18 | 0.82 | 1.02 | 0.84 |
| MAXIMUM LINEAR HEAT RATE (W/cm) | 390 | 360 | 380 | 360 |
| BREEDING RATIO | 0.97 | 1.22 | 1.22 | 1.23 |
| MA INCINERATION AMOUNT (kg/cycle) | 104 | 104 | 104 | 105 |

In the invention, if neptunium is added to the reactor core fuel in an amount of about 2%–5% by weight, based on the weight of the fuel and rare earth elements are added to the blankets or the shields in an amount of about 50% by weight, based on the fuel weight, the operation characteristics become substantially equal to those of a fast reactor core with normal mixed oxide (MOX) fuel not containing minor actinide nuclides or rare earth elements.

By the way, americium and curium are nuclides having a large neutron generation amount, gamma dose, and heat In Case 1 in which 5 wt. % of neptunium, 0.7 wt. % of americium and curium, and 20 wt. % of rare earth elements are added to the reactor core fuel, the burn up reactivity becomes 4.2% Δk/kk', which drastically exceeds the limit value 3% Δk/kk', which is the guide for control rod design, making it difficult to control the operation, and introducing a safety problem. Also, the breeding ratio drastically lowers to 0.97 and necessary performance as a fast breeding reactor cannot be demonstrated. In contrast, although the minor actinide nuclides are added in the same amount, if they are added to the reactor core fuel and blankets separately in response to the type of minor actinide nuclide as in the invention (Cases 2–4), the burn up reactivity becomes about 1% $\Delta k/kk'$, which sufficiently falls below the limit value 3% $\Delta k/kk'$. Also, the breeding ratio can be kept at 1.2 or more and necessary performance as a fast breeding reactor can be demonstrated.

As described above, the invention is characterized by the fact that neptunium is added to the reactor core fuel, and that americium (and curium) and rare earth elements are added to the blankets or shields. Therefore, minor actinide nuclides with long half-lives extracted from the spent fuel can be burnt until they incinerate without the load of separating minor actinide nuclides and rare earth elements.

What is claimed is:

1. A method of minor actinide nuclides incineration by adding neptunium of minor actinide nuclides separated from spent fuel to reactor core fuel of a fast reactor and adding americium of the separated minor actinide nuclides and rare earth elements to either or both of radial and axial blankets of the fast reactor for nuclear reaction.

2. A method of minor actinide nuclides incineration by adding neptunium of minor actinide nuclides separated from spent fuel to reactor core fuel of a fast reactor and adding americium of the separated minor actinide nuclides and rare earth elements to either or both of radial and axial shields of the fast reactor for nuclear reaction.

3. The method as claimed in claim 1 wherein curium is added together with americium and rare earth elements.

4. The method as claimed in claim 2 wherein curium is added together with americium and rare earth elements.

5. The method as claimed in claim 1 wherein neptunium is added in an amount of 2% to 5% by weight based on weight of fuel and wherein the rare earth elements are added in an amount of 50% by weight or less based on the weight of the fuel.

6. The method as claimed in claim 2 wherein neptunium is added in an amount of 2% to 5% by weight based on weight of fuel and wherein the rare earth elements are added in an amount of 50% by weight or less based on the weight of the fuel.

7. The method as claimed in claim 3 wherein neptunium is added in an amount of 2% to 5% by weight based on weight of fuel and wherein the rare earth elements are added in an amount of 50% by weight or less based on the weight of the fuel.

8. The method as claimed in claim 4 wherein neptunium is added in an amount of 2% to 5% by weight based on weight of fuel and wherein the rare earth elements are added in an amount of 50% by weight or less based on the weight of the fuel.

9. The method as claimed in any of claims 1–8 wherein minor actinide nuclides separated by a separation method provided by combining a Purex process and a Truex process are used as the minor actinide nuclides to be added.

10. A method for an efficient nuclear reaction of americium and curium in a mixture of americium, curium, and rare earth elements, said method comprising the steps of adding neptunium to reactor core fuel of a fast reactor and placing said mixture on the periphery of the reactor core fuel to which said neptunium is added for causing a nuclear reaction to occur, whereby an efficient nuclear reaction can be caused to occur for americium and curium in said mixture for efficiently making said elements in said mixture incinerate.

11. The method as claimed in claim 10 wherein neptunium is added to the reactor core fuel in an amount of 2% to 5% by weight based on weight of the reactor core fuel and wherein a percentage of the rare earth elements in the mixture of americium, curium, and rare earth elements is 50% or less.

12. The method as claimed in claim 10 wherein the mixture of americium, curium, and rare earth elements is stored in either or both of radial and axial blankets, thereby placing said mixture on the periphery of the reactor core fuel.

13. The method as claimed in claim 12 wherein neptunium is added to the reactor core fuel in an amount of 2% to 5% by weight based on weight of the reactor core fuel and wherein a percentage of the rare earth elements in the mixture of americium, curium, and rare earth elements is 50% or less.

14. A method of making americium and curium incinerate, comprising the steps of:

(1) separating neptunium from spent nuclear fuel;

(2) separating americium and curium from spent nuclear fuel;

(3) placing said separated americium and curium on the periphery of said separated neptunium in a fast reactor core; and (4) causing neptunium to initiate a nuclear reaction for causing an efficient nuclear reaction to occur for said americium and curium separated from the spent nuclear fuel.

15. The method as claimed in claim 14 wherein a Purex process is used to separate neptunium from the spent nuclear fuel and a Truex process is used to separate americium and curium from the spent nuclear fuel.

16. The method as claimed in claim 14 wherein said separated americium and curium are stored in either or both of radial and axial blankets, thereby placing said elements on the periphery of the reactor core fuel.

17. The method as claimed in claim 15 wherein said separated americium and curium are stored in either or both of radial and axial blankets, thereby placing said elements on the periphery of the reactor core fuel.

* * * * *